(12) United States Patent
Tabassi

(10) Patent No.: US 7,407,380 B2
(45) Date of Patent: Aug. 5, 2008

(54) VALVE PIN BUSHING WITH VENT CHANNELS FOR AN INJECTION MOLDING APPARATUS

(75) Inventor: Payman Tabassi, Rockwood (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 224 days.

(21) Appl. No.: 11/347,137

(22) Filed: Feb. 3, 2006

(65) Prior Publication Data

US 2006/0177538 A1 Aug. 10, 2006

Related U.S. Application Data

(60) Provisional application No. 60/649,546, filed on Feb. 4, 2005.

(51) Int. Cl.
*B29C 45/23* (2006.01)
(52) U.S. Cl. ...................................... 425/564
(58) Field of Classification Search .......... 425/549, 425/562, 563, 564, 565, 566
See application file for complete search history.

(56) References Cited

U.S. PATENT DOCUMENTS

| | | | | |
|---|---|---|---|---|
| 3,037,245 | A | * | 6/1962 | Darnell ........................ 425/562 |
| 4,026,518 | A | | 5/1977 | Gellert |
| 4,238,182 | A | | 12/1980 | Mollier |
| 4,433,969 | A | | 2/1984 | Gellert |
| 4,740,151 | A | * | 4/1988 | Schmidt et al. ............. 425/562 |
| 5,378,138 | A | | 1/1995 | Onuma et al. |
| 5,387,099 | A | | 2/1995 | Gellert |
| 5,542,835 | A | | 8/1996 | Kennedy et al. |
| 5,670,190 | A | | 9/1997 | Osuna-Diaz |
| 5,948,448 | A | | 9/1999 | Schmidt |
| 5,955,121 | A | | 9/1999 | Gellert et al. |
| 6,196,826 | B1 | | 3/2001 | Gellert et al. |
| 6,558,148 | B1 | | 5/2003 | Seres |
| 6,729,871 | B2 | | 5/2004 | Sattler et al. |

FOREIGN PATENT DOCUMENTS

| | | |
|---|---|---|
| EP | 1 595 679 A1 | 11/2005 |
| FR | 2837738 | 10/2003 |
| JP | 7-100863 | 4/1995 |
| JP | 7-195447 | 8/1995 |
| WO | WO-2007/017428 | 2/2007 |

\* cited by examiner

*Primary Examiner*—Tim Heitbrink
(74) *Attorney, Agent, or Firm*—Medler Ferro PLLC

(57) ABSTRACT

An injection molding apparatus includes a manifold having a manifold channel for receiving a melt stream from a source. A nozzle having a nozzle channel receives the melt stream from the manifold channel and delivers the melt stream to a mold cavity through a mold gate. A valve pin bushing is provided between the manifold and the nozzle and includes a bore for receiving a valve pin. A chamber is provided in said valve pin bushing and communicates with the bore. An inlet channel extends between an inlet, which is located in an outer surface of the valve pin bushing, and the chamber. A vent channel extends between the chamber and an outlet, which is located in the outer surface of the valve pin bushing. A forced fluid source communicates with the inlet channel to force fluid through the inlet channel, said chamber and the vent channel.

27 Claims, 6 Drawing Sheets

VALVE PIN BUSHING WITH VENT CHANNELS FOR AN INJECTION MOLDING APPARATUS

CROSS REFERENCE TO RELATED APPLICATIONS

This application claims the benefit under 35 U.S.C. §119 (e) of U.S. application Ser. No. 60/649,546 filed Feb. 4, 2005, which is incorporated by reference herein in its entirety.

FIELD OF THE INVENTION

The present invention relates generally to an injection molding apparatus and, in particular to a valve pin bushing having vent channels.

BACKGROUND OF THE INVENTION

In a valve gated injection molding apparatus, a valve pin is slidable through a nozzle channel of a nozzle to selectively close a mold gate and restrict melt flow into a mold cavity. The valve pin slides through a valve pin bushing, which has a bore machined to a high tolerance to fit the valve pin to inhibit leakage of molten material from the nozzle melt channel and provide alignment of the valve pin with the mold gate.

During the injection process, some plastic materials may release gases especially at high temperatures. This gas may escape from the injection molding apparatus through the valve pin receiving bore of the valve pin bushing. Upon contacting colder surfaces within the valve pin bushing, the gas condenses into a liquid and in time, may degrade and harden. The hardened material may inhibit or restrict movement of the valve pin and require the apparatus to be shut down for cleaning and/or repair.

SUMMARY OF THE INVENTION

According to an embodiment of the present invention there is provided an injection molding apparatus including a manifold having a manifold channel for receiving a melt stream from a source, a nozzle having a nozzle channel for receiving the melt stream from the manifold channel, and a mold cavity in communication with the nozzle channel for receiving melt through a mold gate. A valve pin bushing is also provided between the manifold and the nozzle, as well as a valve pin that extends through the nozzle channel for selectively opening the mold gate, wherein the valve pin is slidable through a valve pin bushing bore. The valve pin bushing includes a chamber provided in communication with the valve pin bushing bore, an inlet channel extending between an inlet and the chamber, and a vent channel extending between the chamber and an outlet, wherein the inlet and outlet are located in an outer surface of the valve pin bushing.

In an embodiment, a forced fluid source is in communication with the valve pin bushing inlet channel to force fluid through the inlet channel, the chamber and the vent channel.

BRIEF DESCRIPTION OF THE FIGURES

Embodiments of the present invention will now be described more fully with reference to the accompanying drawings in which like reference numerals indicate similar structure. The drawings are not to scale.

DETAILED DESCRIPTION OF THE INVENTION

Figure 1:
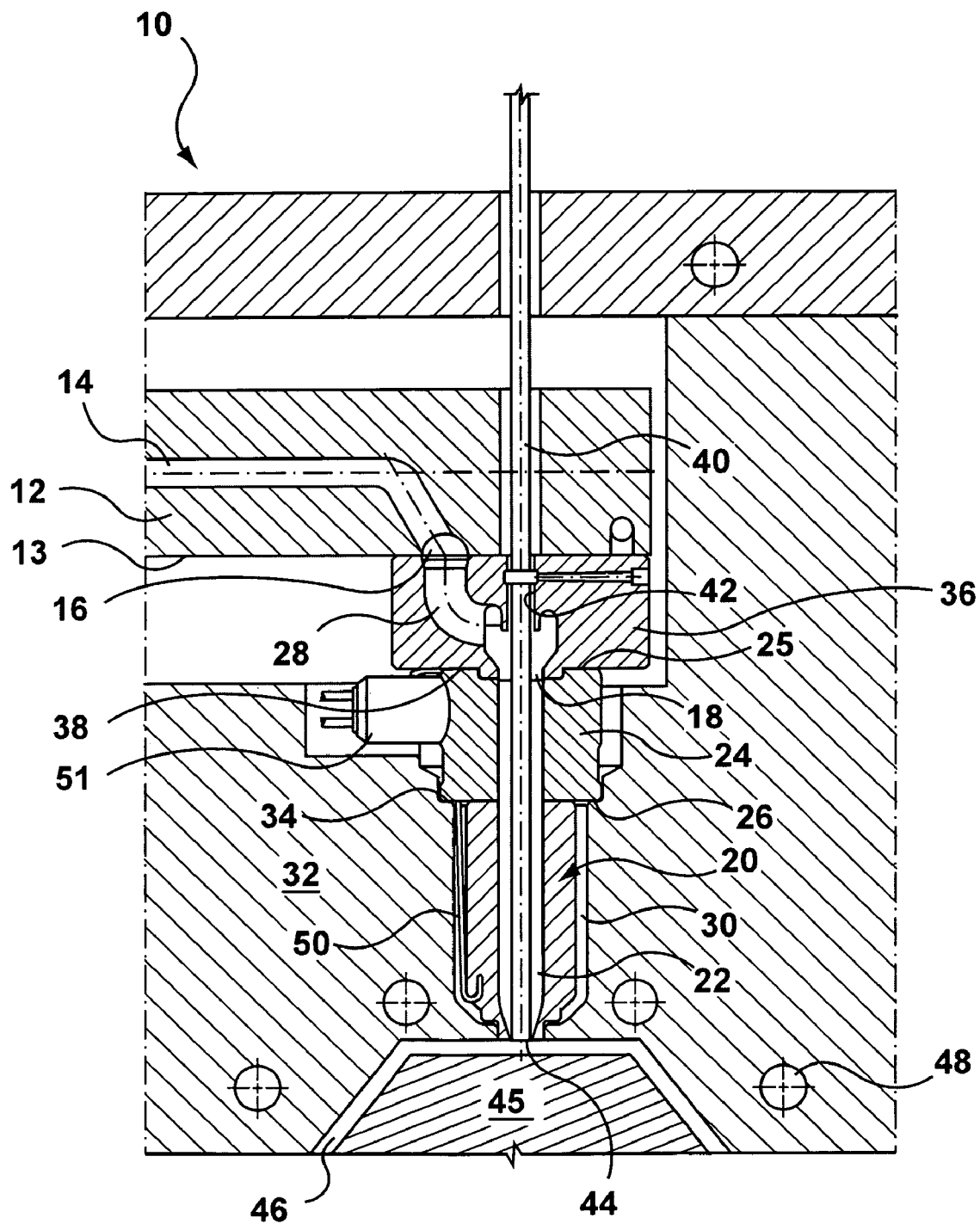
FIG. 1 is a side sectional view of a portion of an injection molding apparatus according to an embodiment of the present invention.

Referring now to FIG. 1, an injection molding apparatus 10 is generally shown. Injection molding apparatus 10 includes a manifold 12 having a manifold melt channel 14. Manifold melt channel 14 extends from an inlet (not shown) to a manifold outlet 16. The inlet receives a melt stream of moldable material from a machine nozzle (not shown) through a sprue bushing (not shown) and delivers the melt to hot runner nozzles 20, which are in fluid communication with respective manifold outlets 16. Although a single hot runner nozzle 20 is shown in FIG. 1, it will be appreciated that a typical injection molding apparatus may include a plurality of hot runner nozzles for receiving melt from respective manifold outlets.

Each hot runner nozzle 20 is received in an opening 30 in a mold plate 32. A valve pin bushing 36 is located between the hot runner nozzle 20 and the manifold 12. A nozzle head 24 of the hot runner nozzle 20 includes a lower surface 26. The lower surface 26 abuts a step 34, which is provided in opening 30 to maintain nozzle head 24 in abutment with a downstream surface 38 of the valve pin bushing 36. A nozzle melt channel 22 extends through hot runner nozzle 20. Nozzle melt channel 22 is in communication with an outlet 18 of melt channel 28 of valve pin bushing 36. Melt channel 28 receives melt from outlet 16 of manifold 12 and delivers the melt to nozzle channel 22. Hot runner nozzle 20 is heated by a heater (not shown) that is coupled to a power source through connector 51 and further includes a thermocouple 50.

A valve pin 40 extends through nozzle melt channel 22 and is slidable through a bore 42 of valve pin bushing 36. The valve pin 40 is axially movable by an actuator (not shown) to selectively engage a mold gate 44. The actuator may be hydraulic, pneumatic or any other suitable type. A locating ring (not shown) maintains manifold 12 in position relative to mold plate 32.

A mold cavity 46 is provided between mold plate 32 and a mold core 45. Mold cavity 46 receives melt from nozzle melt channel 22 through a mold gate 44. Cooling channels 48 extend through mold plate 32 to cool mold cavity 46.

Figure 2:
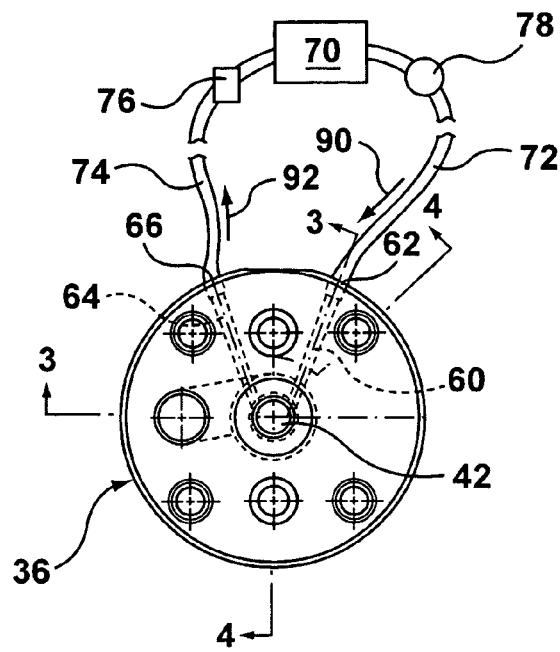
FIG. 2 is a schematic top view of a valve pin bushing of FIG. 2.
Figure 3:
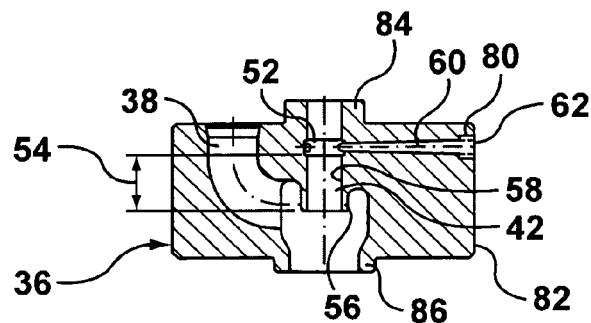
FIG. 3 is a sectional view on 3-3 of a portion of FIG. 2.
Figure 4:
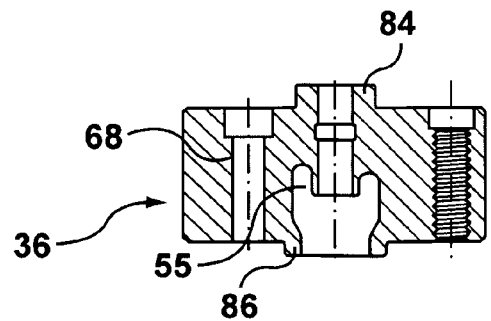
FIG. 4 is a sectional view on 4-4 of a portion of FIG. 2.

Referring to FIGS. 2 to 4, the valve pin bushing 36 includes a chamber 52 that is located approximately mid-way along the bore 42 at a distance 54 from a downstream end 56 thereof. The chamber 52 is generally a groove that is formed in a wall 58 of the bore 42. The bore 42 is sized to receive the valve pin 40 tightly while allowing for uninhibited movement thereof; however, some leakage of melt or melt gases into the bore 42 of the valve pin bushing 36 still occurs. The chamber 52 communicates with the bore 42 and provides a volume for collecting the melt or melt gases that have escaped from the melt channel 38 of the injection molding apparatus 10. An inlet channel 60 extends between an inlet 62 and the chamber 52 and a vent channel 64 extends between the chamber 52 and an outlet 66. In this configuration, melt or melt gases may escape via inlet and vent channels 60, 64 to the surrounding area about valve pin bushing 36.

In an embodiment of the present invention, the inlet channel 60 and vent channel 64 communicate with a forced fluid supply 70 through an inlet pipe 72 and an outlet pipe 74, respectively. The forced fluid supply 70 continuously forces a fluid, such as air, for example, through the chamber 52 of the valve pin bushing 36. The fluid flows into the inlet channel 60 as indicated by arrow 90, through the chamber 52 and out the vent channel 64, as indicated by arrow 92. The continuous circulation of fluid reduces accumulation and degradation of the melt gases in the chamber 52 and the channels 60, 64 over time. The location of the inlet channel 60 and vent channel 64 allows the fluid to be blown through the chamber 52 tangentially to the valve pin 40 and provides a smooth path for the fluid to follow. The forced fluid supply 70 may be an air compressor or any other suitable device.

Fittings 80 are provided in the inlet 62 and the outlet 66 at the outer surface 82 of the valve pin bushing 36 in order to allow the pipes 72, 74 to be connected thereto. The pipes 72, 74 are made of a Teflon™ material to minimize heat loss between the pipes 72, 74 and the valve pin bushing 36. The Teflon™ material further allows the pipes 72, 74 to be flexible enough to pass through the mold channels. The pipes 72, 74 may alternatively be made of another material having suitable properties.

In an alternate embodiment of the present invention, a filter 76 may be provided between the outlet 66 of the vent channel 64 and the forced fluid supply 70. The filter 76 would be provided to remove any foreign material including melt and/or melt gases from the fluid prior to the fluid re-entering the valve pin bushing 36.

In another embodiment of the present invention, a pressure sensor 78 may be provided between the forced fluid supply 70 and the inlet channel 60 in order to indicate the pressure of the fluid entering the inlet channel 60. A pressure increase typically indicates that there is a blockage in the valve pin bushing 36. If the pressure rises above a predetermined level, the injection molding apparatus 10 may be shut down in order to allow for cleaning of the chamber 52 and the inlet and vent channels 60, 64. In still another embodiment, the pressure sensor 78 may alternatively be provided in the outlet pipe 74. In this case, if the pressure falls below a predetermined level, a blockage in the valve pin bushing 36 is indicated, and the injection molding apparatus 10 may be shut down in order to allow for cleaning of the chamber 52 and the inlet and vent channels 60, 64.

In another embodiment, a temperature sensor is provided to indicate the temperature in the valve pin bushing 36. The temperature of the forced fluid may be controlled in order to cool the valve pin bushing 36, which may help to prevent leakage of melt or melt gases into the bore 42.

The valve pin bushing 36 further includes an upstream projection 84 for mating with an outlet surface 13 of the manifold 12 and a downstream projection 86 for mating with an inlet surface 25 of the nozzle 20. Bores 68 extend through valve pin bushing 36 for receiving fasteners (not shown).

As shown in FIGS. 3 and 4, the downstream end 56 of bore 42 includes a thin-walled portion 55 in order to increase the flexibility thereof. The increased flexibility allows the downstream end 56 to deflect slightly as a result of the pressure of the melt stream in melt channel 38, which improves the seal between the valve pin 40 and the bore 42.

In operation, the valve pin 40 is moved from the extended position of FIG. 1, in which the valve pin 40 is seated in mold gate 44, to a retracted position, in which the valve pin 40 is clear of the mold gate 44. Melt is then injected from the machine nozzle into manifold channel 14 of manifold 12 through the sprue bushing. The melt flows from the manifold channel 14, through the melt channel 38 of the valve pin bushing 36 and into the nozzle channel 22 of the nozzle 20. From the nozzle channel 22, the melt passes through mold gate 44 and enters mold cavity 46. Once the mold cavities 46 have been filled with melt, the valve pin 40 is returned to the extended position and the melt is cooled. The molded parts then are ejected from injection molding apparatus 10. During operation, fluid is continuously forced through the inlet channel 60, chamber 52 and vent channel 64 to allow the valve pin 40 to reciprocate freely over an extended period of time to reduce required cleaning of the valve pin bushing 36.

Figure 5:
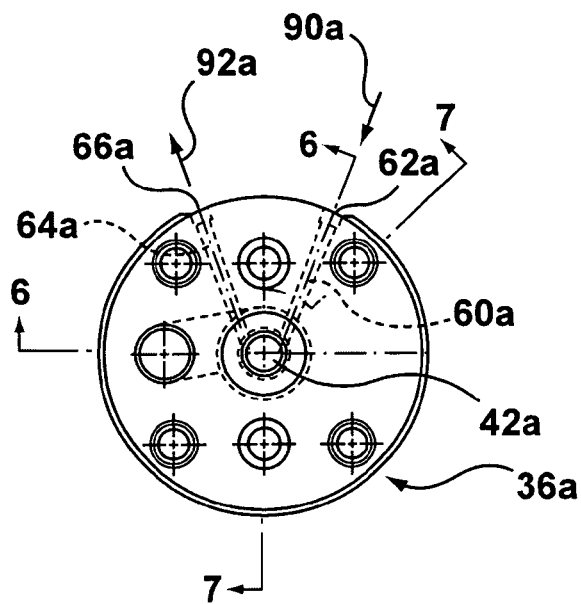
FIG. 5 is a top view of another embodiment of a valve pin bushing.
Figure 6:
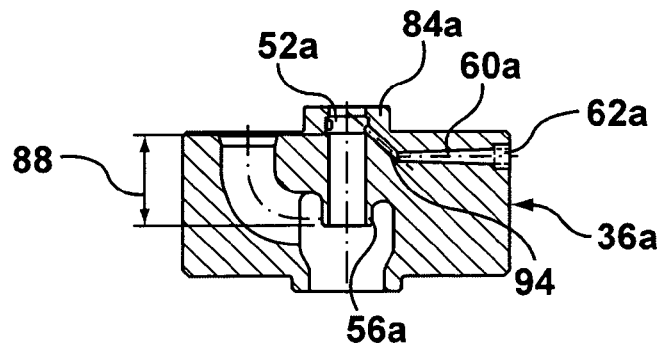
FIG. 6 is a sectional view on 6-6 of FIG. 5.
Figure 7:
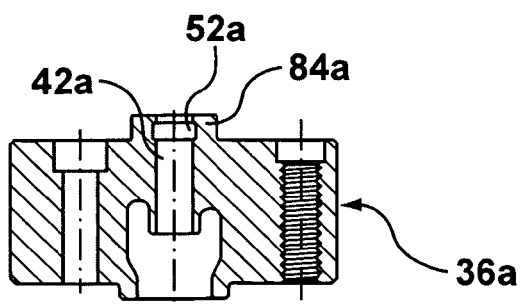
FIG. 7 is a sectional view on 7-7 of FIG. 5.

Referring to FIGS. 5 to 7, another embodiment of a valve pin bushing 36a is shown. In this embodiment, chamber 52a is located within upstream projection 84a of the valve pin bushing 36a at a distance 88 from downstream end 56a of bore 42a. Inlet channel 60a and vent channel 64a each include an angled channel portion 94 to join the chamber 52a to the inlet 62a and outlet 66a, respectively. The angled channel portions 94 allow the inlet 62a and outlet 66a to remain in the same location as shown in the embodiment of FIGS. 1-4. In operation, fluid is forced into inlet channel 60a from a forced fluid supply (not shown), as indicated by arrow 90a, through chamber 52a and out of vent channel 64a, as indicated by arrow 92a, as has been previously described.

Figure 8:
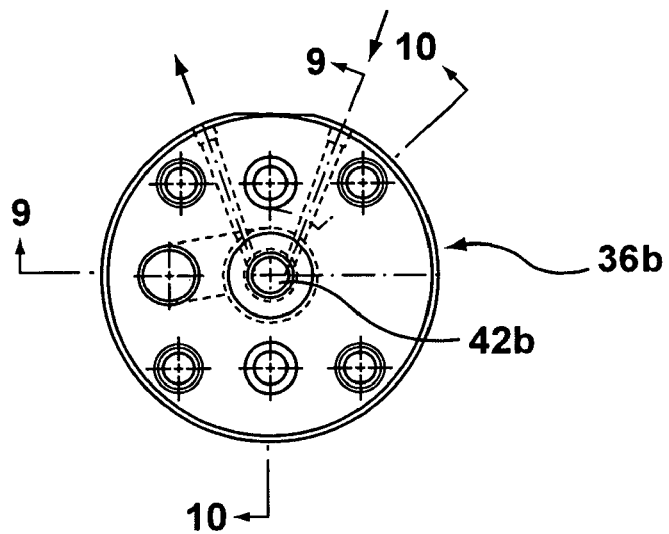
FIG. 8 is a top view of another embodiment of a valve pin bushing.
Figure 9:
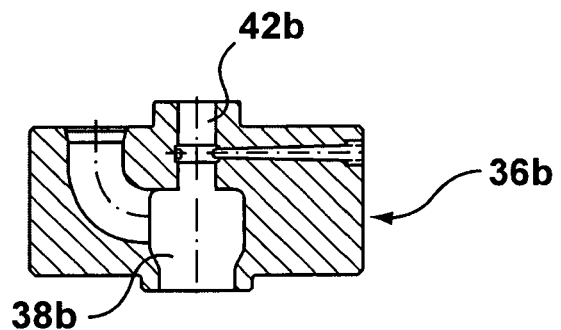
FIG. 9 is a sectional view on 9-9 of FIG. 8.
Figure 10:
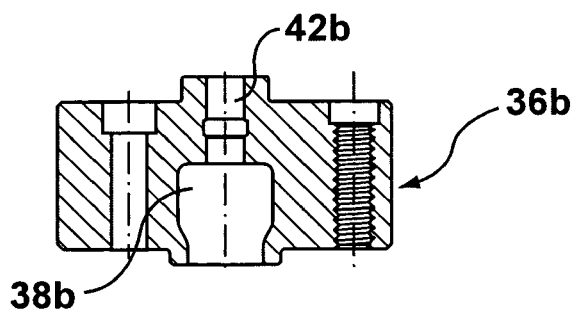
FIG. 10 is a sectional view on 10-10 of FIG. 8.

Another embodiment of a valve pin bushing 36b is shown in FIGS. 8 to 10. In this embodiment, thin-walled portion 55 of the previous embodiments has been eliminated. The length of bore 42b is reduced and the melt stream passing through melt channel 38b does not surround any portion of the bore 42b. Operation of the valve pin bushing 36b is similar to the previous embodiments and therefore will not be described further.

Figure 11:
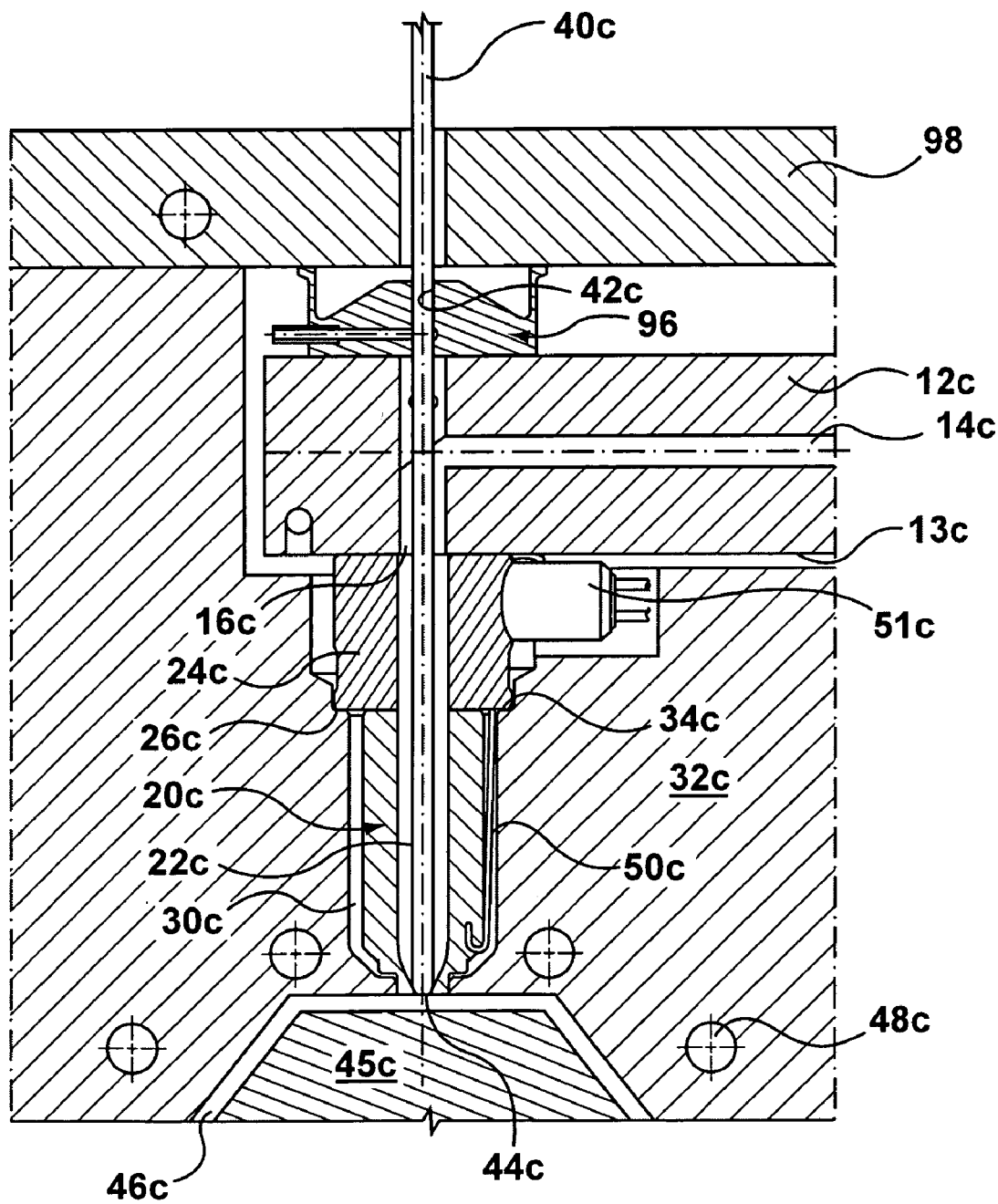
FIG. 11 is a side sectional view of a portion of an injection molding apparatus according to another embodiment of the present invention.

Referring to FIG. 11, another embodiment of an injection molding apparatus is generally shown at 10c. Injection molding apparatus 10c includes a manifold 12c having a manifold melt channel 14c. Manifold melt channel 14c extends from an inlet (not shown) to a manifold outlet 16c. The inlet receives a melt stream of moldable material from a machine nozzle (not shown) through a sprue bushing (not shown) and delivers the melt to hot runner nozzles 20c, which are in fluid communication with respective manifold outlets 16c. Although a single hot runner nozzle 20c is shown in FIG. 11, it will be appreciated that a typical injection molding apparatus may include a plurality of hot runner nozzles for receiving melt from respective manifold outlets.

Each hot runner nozzle 20c is received in an opening 30c in a mold plate 32c. A nozzle head 24c of the hot runner nozzle 20c includes a lower surface 26c. The lower surface 26c abuts a step 34c, which is provided in opening 30c to maintain nozzle head 24c in abutment with an outlet surface 13c of the manifold 12c. A nozzle melt channel 22c extends through hot runner nozzle 20c. Nozzle melt channel 22c is in communication with manifold outlet 16c. Hot runner nozzle 20c is heated by a heater (not shown) that is coupled to a power source through connector 51c and further includes a thermocouple 50c.

A valve pin 40c extends through nozzle melt channel 22c and is slidable through a bore 42c of a valve disk 96, which is positioned between manifold 12c and a back plate 98. The valve pin 40c is axially movable by an actuator (not shown) to selectively engage a mold gate 44c. The actuator may be hydraulic, pneumatic or any other suitable type. A locating ring (not shown) maintains manifold 12c in position relative to mold plate 32c.

A mold cavity 46c is provided between mold plate 32c and a mold core 45c. Mold cavity 46c receives melt from nozzle melt channel 22c through a mold gate 44c. Cooling channels 48c extend through mold plate 32c to cool mold cavity 46c.

Figure 12:
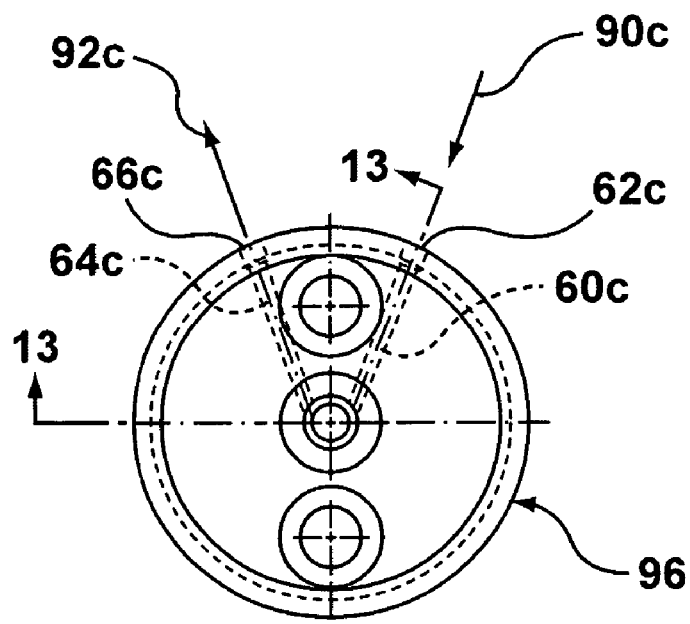
FIG. 12 is a top view of a valve pin bushing of FIG. 11.
Figure 13:
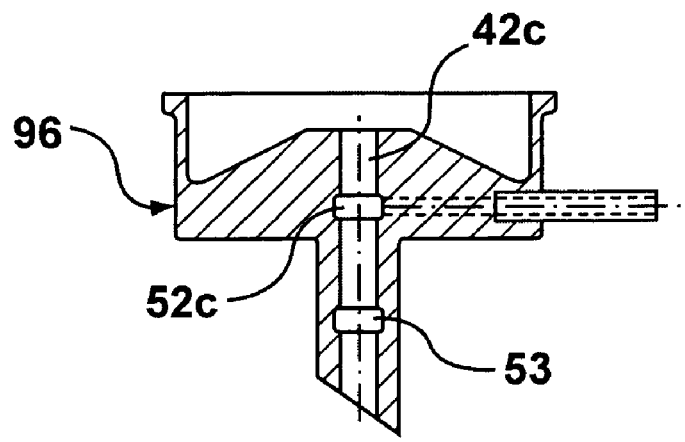
FIG. 13 is a sectional view on 13-13 of FIG. 12.

As shown in FIGS. 12 and 13, the valve disk 96 includes a chamber 52c adjacent bore 42c, which is similar to the chambers 52, 52a, and 52b of the previous embodiments. The valve disk 96 further includes an inlet channel 60c and a vent channel 64c, which communicate with a forced fluid source (not shown). The forced fluid source forces a fluid, typically air, into an inlet 62c, as indicated by arrow 90c, through chamber 52c and out of an outlet 66c, as indicated by arrow 92c. An additional chamber 53 may be added to aid in preventing leakage of molten plastic though the bore 42c of the valve disk 96. Valve disks 96 are known in the art and described in U.S. Pat. No. 5,443,381 to Gellert, which is incorporated by reference herein in its entirety, and therefore will not be further described. The inlet channel 60c, chamber 52c and vent channel 64c operate in a similar manner as has been previously described with respect to the valve pin bushings 36, 36b, 36c of FIGS. 1-10 to force melt and/or melt gases out of the chamber 52c to avoid degradation and hardening of the melt and/or melt gases.

It will be appreciated by persons skilled in the art that although the chamber 52 is shown adjacent the bore 42 in each of the embodiment, the chamber 52 may be located anywhere within the valve pin bushing 36 as long as the chamber 52 is in communication with the bore 42.

It will further be appreciated by persons skilled in the art that the forced fluid supply 70 is not limited to using air. Any other suitable fluid may alternatively be used.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a manifold for receiving a melt stream from a source;
   a nozzle having a nozzle channel for receiving the melt stream from said manifold;
   a mold cavity in communication with said nozzle channel for receiving melt through a mold gate;
   a valve pin extending through said nozzle channel for selectively opening said mold gate;
   a valve pin bushing provided between said manifold and said nozzle, said valve pin bushing having a bore for slidably receiving said valve pin;
   a chamber provided in said valve pin bushing, said chamber being in communication with said valve pin bore;
   an inlet channel provided in said valve pin bushing, said inlet channel extending between an inlet located in an outer surface of said valve pin bushing and said chamber; and
   a vent channel provided in said valve pin bushing, said vent channel extending between said chamber and an outlet located in said outer surface of said valve pin bushing.

2. The injection molding apparatus of claim 1 further comprising:
   a forced fluid source in communication with said valve pin bushing inlet channel to force fluid through said inlet channel, said chamber and said vent channel.

3. The injection molding apparatus of claim 2, wherein said forced fluid source is a forced air source.

4. The injection molding apparatus of claim 3, wherein said inlet channel, said vent channel, and said forced air source provide a continuous forced air circuit.

5. The injection molding apparatus of claim 4, wherein a filter is located between said vent channel and said forced air source to remove foreign particles from the air.

6. The injection molding apparatus of claim 5, wherein said forced air circuit further includes a pressure sensor for indicating a blockage in said forced air circuit.

7. The injection molding apparatus of claim 3, further comprising:
   a first pipe extending between said forced air source and said valve pin bushing inlet channel; and
   a second pipe extending between said valve pin bushing vent channel and said forced air source, said filter being provided in said second pipe.

8. The injection molding apparatus of claim 7, wherein said pressure sensor is located in said first pipe.

9. The injection molding apparatus of claim 4, wherein said forced air circuit further includes a temperature sensor.

10. The injection molding apparatus of claim 1, wherein melt is located in said chamber of said valve pin bushing.

11. The injection molding apparatus of claim 10, wherein said chamber is a groove in a wall of said valve pin bushing bore.

12. The injection molding apparatus of claim 3, wherein said forced air source clears said valve pin bushing inlet channel, chamber and vent channel of gases escaping from the melt stream.

13. An injection molding apparatus comprising:
   a manifold for receiving a melt stream from a source;
   a nozzle having a nozzle channel for receiving the melt stream from said manifold;
   a mold cavity in communication with said nozzle channel for receiving melt through a mold gate;
   a valve pin extending through said nozzle channel for selectively opening said mold gate;
   a valve pin bushing provided on an opposite side of said manifold from said nozzle, said valve pin bushing having a bore for slidably receiving said valve pin;
   a chamber provided in said valve pin bushing, said chamber being in communication with said valve pin bore;
   a first channel provided in said valve pin bushing, said first channel extending between an outer surface of said valve pin bushing and said chamber;
   a second channel provided in said valve pin bushing, said second channel extending between said chamber and said outer surface of said valve pin bushing; and
   a forced fluid source in communication with said first channel of said valve pin bushing to force fluid through said first channel, said chamber, and said second channel.

14. The injection molding apparatus of claim 13, wherein said forced fluid source is a forced air source.

15. The injection molding apparatus of claim 13, wherein said first channel, said second channel, and said forced fluid source provide a continuous forced fluid circuit.

16. The injection molding apparatus of claim 15, wherein a filter is located between said second channel and said forced fluid source to remove foreign particles from the fluid.

17. The injection molding apparatus of claim 15, wherein said forced fluid circuit further includes a temperature sensor.

18. The injection molding apparatus of claim 13, further comprising:
  a pressure sensor for indicating a blockage in said valve pin bushing.

19. The injection molding apparatus of claim 13, further comprising:
  a first pipe extending between said forced fluid source and said first channel of said valve pin bushing; and
  a second pipe extending between said second channel of said valve pin bushing and said forced fluid source.

20. The injection molding apparatus of claim 19, wherein a pressure sensor is located in said first pipe.

21. The injection molding apparatus of claim 19, wherein a filter is located in said second pipe.

22. The injection molding apparatus of claim 13, wherein said chamber is a groove in a wall of said bore of said valve pin bushing.

23. The injection molding apparatus of claim 13, wherein said forced fluid source clears said first channel, said chamber, and said second channel of gases escaping from the melt stream.

24. The injection molding apparatus of claim 13, wherein said valve pin bushing is positioned between said manifold and a back plate.

25. The injection molding apparatus of claim 13, further comprising:
  a filter coupled to an outlet of said second channel.

26. The injection molding apparatus of claim 13, wherein the locations of said first channel and said second channel allow fluid to be forced through said chamber tangential to said valve pin.

27. The injection molding apparatus of claim 1, further comprising:
  a filter coupled to the outlet of said vent channel.

* * * * *

UNITED STATES PATENT AND TRADEMARK OFFICE
CERTIFICATE OF CORRECTION

PATENT NO. : 7,407,380 B2  Page 1 of 1
APPLICATION NO. : 11/347137
DATED : August 5, 2008
INVENTOR(S) : Payman Tabassi It is certified that error appears in the above-identified patent and that said Letters Patent is hereby corrected as shown below:

In column 6, claim 6, line 12, after "claim" replace "5" with -- 4 --.

In column 6, claim 8, line 22, replace "said" after "wherein" with -- a--.

Signed and Sealed this

Fourth Day of November, 2008

JON W. DUDAS
*Director of the United States Patent and Trademark Office*